United States Patent
Shin et al.

(10) Patent No.: US 11,421,059 B2
(45) Date of Patent: Aug. 23, 2022

(54) ACRYLIC COPOLYMER, METHOD OF PREPARING THE SAME, AND ACRYLIC COPOLYMER COMPOSITION INCLUDING THE SAME

(71) Applicant: LG Chem, Ltd., Seoul (KR)

(72) Inventors: Sang Jin Shin, Daejeon (KR); Jung Su Han, Daejeon (KR); Seung Uk Yeu, Daejeon (KR); Yong Seok Jung, Daejeon (KR)

(73) Assignee: LG Chem, Ltd.

( * ) Notice: Subject to any disclaimer, the term of this patent is extended or adjusted under 35 U.S.C. 154(b) by 27 days.

(21) Appl. No.: 16/978,359

(22) PCT Filed: Nov. 7, 2019

(86) PCT No.: PCT/KR2019/015015
§ 371 (c)(1),
(2) Date: Sep. 4, 2020

(87) PCT Pub. No.: WO2020/122422
PCT Pub. Date: Jun. 18, 2020

(65) Prior Publication Data
US 2021/0002401 A1 Jan. 7, 2021

(30) Foreign Application Priority Data
Dec. 13, 2018 (KR) .......................... 10-2018-0161342

(51) Int. Cl.
| C08K 3/04 | (2006.01) |
| C08K 3/06 | (2006.01) |
| C08K 5/098 | (2006.01) |
| C08F 220/12 | (2006.01) |

(52) U.S. Cl.
CPC .............. *C08F 220/12* (2013.01); *C08K 3/04* (2013.01); *C08K 3/06* (2013.01); *C08K 5/098* (2013.01)

(58) Field of Classification Search
CPC ........... C08F 220/12; C08K 3/04; C08K 3/06; C08K 5/098
USPC ....................................................... 524/301
See application file for complete search history.

(56) References Cited

U.S. PATENT DOCUMENTS

| 2008/0118751 A1 | 5/2008 | Zollner et al. |
| 2008/0249246 A1 | 10/2008 | Okada et al. |
| 2009/0005507 A1 | 1/2009 | Masaki et al. |
| 2015/0184017 A1 | 7/2015 | Hustad et al. |
| 2018/0254189 A1 | 9/2018 | Xu |

FOREIGN PATENT DOCUMENTS

| CN | 101023146 A | 8/2007 | |
| CN | 106632925 A | 5/2017 | |
| EP | 3305860 A1 * | 4/2018 | ............... C08F 2/44 |
| EP | 3305860 A1 | 4/2018 | |
| JP | 4787018 B2 | 10/2011 | |
| JP | 2016029129 A | 3/2016 | |
| JP | 2017110204 A | 6/2017 | |
| JP | 6296583 B1 * | 3/2018 | |
| JP | 6296583 B1 | 3/2018 | |
| JP | 2018159018 A | 10/2018 | |
| KR | 20070044603 A | 4/2007 | |
| KR | 20080100183 A | 11/2008 | |
| KR | 20080100798 A | 11/2008 | |
| KR | 20170084001 A | 7/2017 | |

OTHER PUBLICATIONS

Extended European Search Report including Written Opinion for Application No. 19894885.3 dated Jul. 27, 2021, pp. 1-5.
Wang, Qiong, et al., "Synthesis of Acrylic Rubber by Emulsion Polymerization and Its Research Progress", Elastomer, vol. 27 (3), (Jun. 25, 2017) pp. 73-76.
Search Report for Application No. 201980016862.4 dated Sep. 29, 2021. 2 pgs.
International Search Report for Application No. PCT/KR2019/015015 dated Feb. 13, 2020, 2 pages.

* cited by examiner

*Primary Examiner* — Kelechi C Egwim
(74) *Attorney, Agent, or Firm* — Lerner, David, Littenberg, Krumholz & Mentlik, LLP

(57) ABSTRACT

An acrylic copolymer is provided. The acrylic copolymer includes: a main monomer-derived repeating unit; and a chain transfer agent-derived part, wherein the main monomer-derived repeating unit includes a (meth)acrylic acid alkyl ester monomer-derived repeating unit, a (meth)acrylic acid alkoxy alkyl ester monomer-derived repeating unit, and a crosslinking monomer-derived repeating unit, the chain transfer agent-derived part is derived from a chain transfer agent having a carbonothioylthio group, and the chain transfer agent-derived part is included in an amount of 0.03 parts by weight to 0.08 parts by weight with respect to 100 parts by weight of the main monomer-derived repeating unit. A method of preparing the same, and an acrylic copolymer composition including the same is also provided.

11 Claims, No Drawings

ACRYLIC COPOLYMER, METHOD OF PREPARING THE SAME, AND ACRYLIC COPOLYMER COMPOSITION INCLUDING THE SAME

CROSS-REFERENCE TO RELATED APPLICATION(S)

The present application is a national stage entry under 35 U.S.C. § 371 of International Application No. PCT/KR2019/015015 filed on Nov. 7, 2019, which claims priority to Korean Patent Application No. 10-2018-0161342, filed on Dec. 13, 2018, the entire contents of which are incorporated herein by reference.

TECHNICAL FIELD

The present invention relates to an acrylic copolymer, and more particularly, to an acrylic copolymer having an excellent workability and durability, a method of preparing the same, and an acrylic copolymer composition including the same.

BACKGROUND ART

A rubber component used in a vehicle is only 5% of the entire weight of the vehicle, but is mainly used for an important part affecting performance of the vehicle. The rubber component is considered as an important component such as a part applied to a portion at which vibration and noise are generated and a part applied to a portion at which heat resistance and oil resistance are required, due to its characteristics. In particular, a material having an excellent heat resistance and oil resistance is required for an engine of a small-sized vehicle requiring a high output.

Among various specific rubbers, acrylic rubber is rubber having (meth)acrylic acid alkyl ester as a main monomer unit, and has an excellent heat resistance and oil resistance. Accordingly, in vehicle related fields and the like, the acrylic rubber has been widely used as a material of a rubber component not only for a seal, a hose, a tube, or a belt but also for an adhesive. Elasticity is imparted to acrylic rubber through crosslinking so as to be used as a rubber component, and to this end, crosslinking monomers each having an active crosslinking site are copolymerized in the acrylic rubber. In general, crosslinking acrylic rubber in which the crosslinking monomers are copolymerized is mixed with a filling material such as carbon black or a crosslinking agent to prepare a crosslinking acrylic rubber composition. The crosslinking acrylic rubber composition is molded in a mold having a desired shape and used for various uses.

As such, it is required for the crosslinking acrylic rubber used for various uses to have an excellent roll mill workability or molding workability in order to be molded as a molded product having a desired shape as well as an excellent heat resistance and oil resistance. In addition, in order to implement durability suitable for the above uses, it is required for acrylic rubber to have a high crosslinking density. However, crosslinking is generated during a preparation process due to characteristics of crosslinking acrylic rubber, such that uniformity of a crosslinking monomer deteriorates, which results in deterioration of workability and durability.

DISCLOSURE

Technical Problem

In order to solve the problems mentioned in the background art, an object of the present invention is to improve workability and durability of an acrylic copolymer through uniform crosslinking when preparing the acrylic copolymer.

That is, an object of the present invention is to provide an acrylic copolymer composition having an excellent workability and durability by including an acrylic copolymer prepared by lowering self-crosslinking of the acrylic copolymer to lower crosslinking of a polymer and controlling a reaction rate to have a uniform distribution of crosslinking monomers.

Technical Solution

In one general aspect, there is provided an acrylic copolymer including: a main monomer-derived repeating unit; and a chain transfer agent-derived part, wherein the main monomer-derived repeating unit includes a (meth)acrylic acid alkyl ester monomer-derived repeating unit, a (meth)acrylic acid alkoxy alkyl ester monomer-derived repeating unit, and a crosslinking monomer-derived repeating unit, the chain transfer agent-derived part is derived from a chain transfer agent having a carbonothioylthio group, and the chain transfer agent-derived part is included in an amount of 0.03 parts by weight to 0.08 parts by weight with respect to 100 parts by weight of the main monomer-derived repeating unit.

In another general aspect, there is provided a method of preparing an acrylic copolymer, the method including: a step of preparing a main monomer mixture including a (meth) acrylic acid alkyl ester monomer, a (meth)acrylic acid alkoxy alkyl ester monomer, and a crosslinking monomer; and a step of adding 0.03 parts by weight to 0.08 parts by weight of a chain transfer agent with respect to 100 parts by weight of the main monomer mixture and performing polymerization, wherein the chain transfer agent has a carbonothioylthio group.

In still another aspect, there is provided an acrylic copolymer composition including the acrylic copolymer and a filler.

Advantageous Effects

The acrylic copolymer including a chain transfer agent according to the present invention induces a chain transfer reaction and lowers self-crosslinking of a polymer to lower crosslinking of the polymer, thereby having an excellent workability. In addition, the acrylic copolymer including a chain transfer agent according to the present invention controls a polymerization reaction rate to have a uniform distribution of crosslinking monomers, thereby having an excellent durability through the uniform crosslinking.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

The terms "-derived repeating unit" and "-derived part" in the present invention may refer to a component or structure derived from a certain material or the material itself. As a specific example, the term "-derived repeating unit" may refer to a repeating unit formed in a polymer by an added monomer participating in a polymerization reaction at the time of polymerization. The term "-derived part" may induce a chain transfer reaction of a polymer by an added chain transfer agent participating in a polymerization reaction at the time of polymerization.

The term "copolymer" in the present invention may refer to a copolymer formed by copolymerizing comonomers, and as a specific example, may refer to a random copolymer and a block copolymer.

Hereinafter, the present invention will be described in more detail for assisting in understanding of the present invention.

An acrylic copolymer according to the present invention may include a main monomer-derived repeating unit and a chain transfer agent-derived part.

The main monomer-derived repeating unit may include a (meth)acrylic acid alkyl ester monomer-derived repeating unit, a (meth)acrylic acid alkoxy alkyl ester monomer-derived repeating unit, and a crosslinking monomer-derived repeating unit.

The (meth)acrylic acid alkyl ester monomer-derived repeating unit, which is a component that controls a glass transition temperature in an acrylic copolymer and serves to increase workability, heat resistance, and cold resistance of a final product, may be a (meth)acrylic acid alkyl ester monomer containing an alkyl group having 1 to 8 carbon atoms. Here, the alkyl group having 1 to 8 carbon atoms may be construed as including a linear or cyclic alkyl group having 1 to 8 carbon atoms. As a specific example, the (meth)acrylic acid alkyl ester monomer may be (meth)acrylic acid methyl, (meth)acrylic acid ethyl, (meth)acrylic acid propyl, (meth)acrylic acid isopropyl, (meth)acrylic acid n-butyl, (meth)acrylic acid isobutyl, (meth)acrylic acid n-amyl, (meth)acrylic acid isoamyl, (meth)acrylic acid n-hexyl, (meth)acrylic acid 2-ethylhexyl, (meth)acrylic acid cyclohexyl, and the like. Here, the (meth)acrylic acid alkyl ester monomer may be used alone or in combination of two or more thereof, and as a specific example, may be (meth)acrylic acid ethyl, (meth)acrylic acid n-butyl monomer, and the like.

A content of the (meth)acrylic acid alkyl ester monomer-derived repeating unit in the main monomer-derived repeating unit may be 65 wt % to 95 wt %, 75 wt % to 93 wt %, or 80 wt % to 90 wt %, and in this range, workability, heat resistance, and cold resistance of the acrylic copolymer according to the present invention may be excellent.

The (meth)acrylic acid alkoxy alkyl ester monomer-derived repeating unit, which is a component that controls a glass transition temperature in an acrylic copolymer and serves to increase workability, heat resistance, and cold resistance of a final product, may refer to a (meth)acrylic acid alkyl ester monomer containing an alkoxy alkyl group having 1 to 8 carbon atoms. As a specific example, the (meth)acrylic acid alkoxy alkyl ester monomer may be (meth)acrylic acid methoxymethyl, (meth)acrylic acid ethoxymethyl, (meth)acrylic acid 2-ethoxymethyl, (meth)acrylic acid 2-butoxyethyl, (meth)acrylic acid 2-methoxyethyl, (meth)acrylic acid 2-propoxyethyl, (meth)acrylic acid 3-methoxypropyl, (meth)acrylic acid 4-methoxybutyl, and the like. As a specific example, the (meth)acrylic acid alkoxy alkyl ester monomer may be (meth)acrylic acid 2-methoxyethyl.

A content of the (meth)acrylic acid alkoxy alkyl ester monomer-derived repeating unit in the main monomer-derived repeating unit may be 5 wt % to 35 wt %, 7 wt % to 25 wt %, or 10 wt % to 20 wt %, and in this range, workability and oil resistance of the acrylic copolymer according to the present invention may be excellent.

Meanwhile, a total content of the (meth)acrylic acid alkyl ester monomer-derived repeating unit and the (meth)acrylic acid alkoxy alkyl ester monomer-derived repeating unit in the main monomer-derived repeating unit according to the present invention may be 80 wt % to 99.9 wt %, 85 wt % to 99.9 wt %, or 90 wt % to 99.5 wt %, and in this range, workability, heat resistance, and cold resistance of the acrylic copolymer according to the present invention may be excellent.

The crosslinking monomer-derived repeating unit, which is a component for giving a crosslinking functional group in an acrylic copolymer, may be one or more selected from the group consisting of a butenedionic acid monoester monomer, an epoxy group-containing monomer, and a halogen-containing monomer.

The butenedionic acid monoester monomer may be a maleic acid monoester monomer or a fumaric acid monoester monomer obtained by reacting butenedionic acid, that is, a carboxyl group of maleic acid or fumaric acid with alcohol. The maleic acid monoester monomer may be a maleic acid monoalkyl ester monomer such as maleic acid monomethyl, maleic acid monoethyl, maleic acid monopropyl, maleic acid monobutyl, maleic acid monopentyl, or maleic acid monodecyl; a maleic acid monocycloalkyl ester monomer such as maleic acid monocyclopentyl, maleic acid monocyclohexyl, maleic acid monocycloheptyl, maleic acid monocyclooctyl, maleic acid monomethylcyclohexyl, maleic acid mono-3,5-dimethylcyclohexyl, maleic acid monodicyclopentanyl, or maleic acid monoisobornyl; a maleic acid monocycloalkenyl ester monomer such as maleic acid monocyclopentenyl, maleic acid monocyclohexenyl, maleic acid monocycloheptenyl, maleic acid monocyclooctenyl, or maleic acid dicyclopentadienyl; and the like. The fumaric acid monoester monomer may be a fumaric acid monoalkyl ester monomer such as fumaric acid monomethyl, fumaric acid monoethyl, fumaric acid monopropyl, fumaric acid monobutyl, fumaric acid monohexyl, or fumaric acid monooctyl; a fumaric acid monocycloalkyl ester monomer such as fumaric acid monocyclopentyl, fumaric acid monocyclohexyl, fumaric acid monocycloheptyl, fumaric acid monocyclooctyl, fumaric acid monomethyl cyclohexyl, fumaric acid mono-3,5-dimethylcyclohexyl, fumaric acid dicyclopentanyl, or fumaric acid isobornyl; a fumaric acid monocycloalkenyl ester monomer such as fumaric acid monocyclopentenyl, fumaric acid monocyclohexenyl, fumaric acid monocycloheptenyl, fumaric acid monocyclooctenyl, or fumaric acid monodicyclopentadienyl; and the like.

The epoxy group-containing monomer may be glycidyl (meth)acrylate, vinyl glycidyl ether, allyl glycidyl ether, methacryl glycidyl ether, and the like. As a specific example, the epoxy group-containing monomer may be glycidyl (meth)acrylate, allyl glycidyl ether, and the like.

The halogen-containing monomer may be vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ether, 4-chloro-2-butenyl acrylate, vinyl benzyl chloride, 5-chloromethyl-2-norbornene, 5-chloroacetoxymethyl-2-norbornene, and the like. As a specific example, the halogen-containing monomer may be vinyl chloroacetate, vinyl benzyl chloride, 2-chloroethyl acrylate, 2-chloroethyl vinyl ether, and the like.

A content of the crosslinking monomer-derived repeating unit in the main monomer-derived repeating unit may be 0.1 wt % to 20 wt %, 0.1 wt % to 15 wt %, or 0.5 wt % to 10 wt %, and in this range, the acrylic copolymer according to the present invention may have a high crosslinking density and an excellent mechanical characteristic, elongation of the obtained crosslinked product may be improved, and a compression set may be prevented.

The main monomer-derived repeating unit may further include another monomer-derived repeating unit copolymerizable with the (meth)acrylic acid alkyl ester monomer-derived repeating unit and the (meth)acrylic acid alkoxy alkyl ester monomer-derived repeating unit, in addition to the (meth)acrylic acid alkyl ester monomer-derived repeating unit, the (meth)acrylic acid alkoxy alkyl ester monomer-derived repeating unit, and the crosslinking monomer-derived repeating unit.

The copolymerizable another monomer-derived repeating unit may be an ethylenically unsaturated nitrile monomer-derived repeating unit.

The ethylenically unsaturated nitrile monomer-derived repeating unit, which is a component that serves to further improve heat resistance, may be acrylonitrile, methacrylonitrile, 2-chloropropene nitrile, 2-butenenitrile, and the like. As a specific example, the ethylenically unsaturated nitrile monomer may be acrylonitrile.

In a case where the main monomer-derived repeating unit includes the ethylenically unsaturated nitrile monomer-derived repeating unit, a content of the ethylenically unsaturated nitrile monomer-derived repeating unit in the main monomer-derived repeating unit may be 0 wt % to 20 wt %, 0.01 wt % to 10 wt %, or 0.1 wt % to 10 wt %, and in this range, heat resistance of the acrylic copolymer according to the present invention may be excellent.

The chain transfer agent-derived part, which is a component that induces a chain transfer reaction of the polymer, lowers self-crosslinking of a polymer, and controls a reaction rate, may be derived from a chain transfer agent having a carbonothioylthio group. As a specific example, the chain transfer agent may be 4-cyano-4-(phenylcarbonothioylthio) pentanoic acid, 1,1,1-tris[(dodecylthiocarbonothioylthio)-ethanoic acid, 2-(4-methoxyphenylcarbonothioylthio)ethanoic acid, 2-(phenylcarbonothioylthio)propanoic acid, 2-nitro-5-(2-propynyloxy)benzyl 4-cyano-4-(phenylcarbonothioylthio)pentanoate, 3-butenyl 2-(dodecylthiocarbonothioylthio)-2-methylpropionate, benzyl benzodithioate, cyanomethyl[3-(trimethoxysilyl)propyl]trithiocarbonate, ethyl 2-(4-methoxyphenylcarbonothioylthio)acetate, ethyl 2-(phenylcarbonothioylthio)-2-phenylacetate, and phthalimidomethyl butyl trithiocarbonate, or a derivative thereof. As a more specific example, the chain transfer agent may be 4-cyano-4-(phenylcarbonothioylthio)pentanoic acid.

The chain transfer agent-derived part controls a reaction rate during a polymerization reaction of the acrylic copolymer, such that a chain transfer agent forming the chain transfer agent-derived part and an initiator in which a radical is generated are reacted with each other and converted into a chain transfer initiator at the beginning of the polymerization reaction, thereby adjusting an average weight molecular weight and a degree of branching of the acrylic copolymer. Such a chain transfer agent-derived part may be formed at a terminal of the acrylic copolymer by being reacted with main monomers forming the main monomer-derived repeating unit as a chain transfer initiator.

A content of the chain transfer agent-derived part may be 0.03 parts by weight to 0.08 parts by weight, 0.03 parts by weight to 0.075 parts by weight, or 0.045 parts by weight to 0.07 parts by weight, with respect to 100 parts by weight of the main monomer-derived repeating unit, and in this range, progress of polymerization reaction of the acrylic copolymer according to the present invention may be efficiently controlled, thereby improving workability of the obtained acrylic rubber while implementing excellent physical properties. Meanwhile, when the amount of chain transfer agent used is too small, the above effects are unlikely to be obtained. On the other hand, when the amount of chain transfer agent used is too large, the polymerization reaction is extremely suppressed, and thus productivity tends to deteriorate.

An average weight molecular weight of the acrylic copolymer may be 750,000 g/mol to 1,600,000 g/mol, 750,000 g/mol to 1,500,000 g/mol, or 890,000 g/mol to 1,360,000 g/mol, and in this range, a preparation time reduction and an excellent mechanical property of the acrylic copolymer may be implemented.

A Mooney viscosity ($ML_{1+4}$, 100° C.) of the acrylic copolymer may be 10 to 70, 20 to 60, or 30 to 50, and in this range, workability may be excellent.

Meanwhile, the Mooney viscosity of the acrylic copolymer may be adjusted by adjusting a content ratio of the initiator and the chain transfer agent, a weight ratio of the initiator and the chain transfer agent may be 1:3 to 18, 1:3 to 15, or 1:4.5 to 7, and in this range, workability may be excellent.

A method of preparing an acrylic copolymer according to the present invention includes: a step of preparing a main monomer mixture including a (meth)acrylic acid alkyl ester monomer, a (meth)acrylic acid alkoxy alkyl ester monomer, and a crosslinking monomer; and a step of adding 0.03 parts by weight to 0.08 parts by weight of a chain transfer agent with respect to 100 parts by weight of the main monomer mixture and performing polymerization. The chain transfer agent may have a carbonothioylthio group.

The step of preparing the main monomer mixture may be a step for preparing a main chain of the acrylic copolymer. In the step of preparing the main monomer mixture, the type and content of monomer added for forming the main monomer mixture may be the same as the type and content of the monomer for forming the main monomer-derived repeating unit described above.

In addition, the step of adding the chain transfer agent and performing polymerization may be a step for inducing a chain transfer reaction of the polymer in the acrylic copolymer. In the step of adding the chain transfer agent and performing polymerization, the type of content of the chain transfer agent added may be the same as the type and content of the chain transfer agent for forming the chain transfer agent-derived part included in the acrylic copolymer described above.

The acrylic copolymer may be polymerized by a method such as an emulsion polymerization, bulk polymerization, suspension polymerization, or solution polymerization method, and may be polymerized by an emulsion polymerization method such as a batch method, a semibatch method, and a continuous method by additionally using additives such as an initiator, an emulsifier, a polymerization terminating agent, ion-exchange water, a molecular weight regulator, an activator, and an oxidation-reduction catalyst.

As an example, the initiator may be inorganic peroxide such as sodium persulfate, potassium persulfate, ammonium persulfate, potassium perphosphate, or hydrogen peroxide; organic peroxide such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, benzoyl peroxide, 3,5,5-trimethylhexanol peroxide, or t-butyl peroxy isobutylate; and a nitrogen compound such as azobisisobutyronitrile, azobis-2,4-dimethylvaleronitrile, azobis cyclohexanecarbonitrile, or azobisisobutyrate methyl. These polymerization initiators may be used alone or in combination of two or more thereof. The initiator may be used in an amount of 0.005 parts by weight to 0.2 parts by weight with respect to 100 parts by weight of the main monomer mixture.

Meanwhile, an organic peroxide or inorganic peroxide initiator may be used as a redox-based polymerization initiator by being combined with a reducing agent. The reducing agent is not particularly limited, but may be a compound containing a metal ion in a reduced state, such as ferrous sulfate and cuprous naphthenate; a sulfonic acid compound such as sodium methanesulfonate; an amine compound such as dimethylaniline; and the like. These reducing agents may be used alone or in combination of two or more thereof. The reducing agent may be used in an amount of 0.03 parts by weight to 20 parts by weight with respect to 1 part by weight of peroxide.

The emulsifier may be one or more selected from the group consisting of an anionic emulsifier, a cationic emulsifier, and a nonionic emulsifier. Specific examples of the emulsifier may include a nonionic emulsifier such as polyoxyethylene alkyl ether, polyoxyethylene alkylphenol ether, polyoxyethylene alkyl ester, or polyoxyethylene sorbitan alkyl ester; an anionic emulsifier such as salt of fatty acid such as myristic acid, palmitic acid, oleic acid, or linolenic acid, alkylbenzene sulfonate such as sodium dodecylbenzenesulfonate, higher alcohol phosphate ester, or alkyl sulfosuccinate; a cationic emulsifier such as alkyl trimethyl ammonium chloride, dialkyl ammonium chloride, or benzyl ammonium chloride; a copolymerizable emulsifier such as sulfoester of α,β-unsaturated carboxylic acid, sulfate ester of α,β-unsaturated carboxylic acid, or sulfoalkylaryl ether; and the like. Among them, the anionic emulsifier is preferably used. The emulsifier may be used in an amount of 0.1 parts by weight to 10 parts by weight with respect to 100 parts by weight of the main monomer mixture.

Water may be used as the ion-exchange water. The ion-exchange water may be used in an amount of 100 parts by weight to 400 parts by weight with respect to 100 parts by weight of the main monomer mixture.

Examples of the molecular weight regulator may include mercaptans such as a-methylstyrene dimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. The molecular weight regulator may be used in an amount of 0.1 parts by weight to 3 parts by weight with respect to 100 parts by weight of the main monomer mixture.

As an example, the activator may be one or more selected from the group consisting of sodium hydrosulfite, sodium formaldehyde sulfoxylate, sodium ethylenediaminetetraacetate, ferrous sulfate, lactose, dextrose, sodium linolenate, and sodium sulfate. The activator may be used in an amount of 0.01 parts by weight to 0.15 parts by weight with respect to 100 parts by weight of the main monomer mixture.

Examples of the oxidation-reduction catalyst may include sodium formaldehyde sulfoxylate, ferrous sulfate, disodium ethylenediaminetetraacetate, and cupric sulfate. The oxidation-reduction catalyst may be used in an amount of 0.01 parts by weight to 0.1 parts by weight with respect to 100 parts by weight of the main monomer mixture.

The acrylic copolymer composition according to the present invention may include the acrylic copolymer obtained as described above and a filler.

The filler may be carbon black, silica, kaolin clay, talc, diatomaceous earth, and the like.

A content of the filler may be 20 parts by weight to parts by weight, 30 parts by weight to 65 parts by weight, or 45 parts by weight to 55 parts by weight, with respect to 100 parts by weight of the acrylic copolymer, and in this range, workability and mechanical properties may be excellent.

Meanwhile, the acrylic copolymer composition according to the present invention may further include sulfur in order to increase a blending crosslinking effect.

In addition, the acrylic copolymer composition may selectively further include a crosslinking agent and a crosslinking accelerator. As the crosslinking agent, an amine compound, and as a specific example, a polyvalent amine compound may be used.

Specific examples of the polyvalent amine compound may include an aliphatic polyvalent amine crosslinking agent and an aromatic polyvalent amine crosslinking agent.

Examples of the aliphatic polyvalent amine crosslinking agent may include hexamethylenediamine, hexamethylenediamine carbamate, and N,N'-dicinnamylidene-1,6-hexanediamine.

Examples of the aromatic polyvalent amine crosslinking agent may include 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylene diamine, p-xylene diamine, 1,3,5-benzene triamine, and 1,3,5-triamino methyl benzene.

A content of the crosslinking agent may be 0.05 parts by weight to 20 parts by weight, 0.1 parts by weight to 10 parts by weight, or 0.3 parts by weight to 6 parts by weight, with respect to 100 parts by weight of the acrylic copolymer, and in this range, it is possible to easily maintain a shape of a crosslinked product and elasticity may be excellent.

The crosslinking accelerator may be used in combination with the polyvalent amine crosslinking agent. A base dissociation constant of the crosslinking accelerator in water at 25° C. may be 10 to 106 or 12 to 106. Specific examples of the crosslinking accelerator may include a guanidine compound, an imidazole compound, a quaternary onium salt, a tertiary phosphine compound, and an alkali metal salt of a weak acid. Examples of the guanidine compound may include 1,3-diphenyl guanidine and di-o-tolyl-guanidine. Examples of the imidazole compound may include 2-methylimidazole and 2-phenylimidazole. Examples of the quaternary onium salt may include tetra-n-butyl ammonium bromide and octadecyl tri-n-butyl ammonium bromide. Examples of the polyvalent tertiary amine compound may include triethylene diamine and 1-8-diazabicyclo[5.4.0]undecene-7. Examples of the tertiary phosphine compound may include triphenyl phosphine and tri-p-tolylphosphine. Examples of the alkali metal salt of a weak acid may include phosphate of sodium or potassium, an inorganic weak acid salt such as carbonate, or an organic weak acid salt such as stearate or laurate.

A content of the crosslinking accelerator may be 0.1 parts by weight to 20 parts by weight, 0.2 parts by weight to 15 parts by weight, or 0.3 parts by weight to 10 parts by weight, with respect to 100 parts by weight of the acrylic copolymer, and in this range, a crosslinking rate may be adequately maintained and a tensile strength of a crosslinked product may be excellent.

The acrylic copolymer composition according to the present invention may further include additives such as a reinforcing agent, an anti-aging agent, a light stabilizer, a plasticizer, a lubricant, an adhesive, a flame retardant, an antifungal agent, an anti-static agent, and a coloring agent, as necessary.

Blending of the acrylic copolymer composition according to the present invention may be performed by an adequate mixing method such as a roll mixing, Banbury mixing, screw mixing, or solution mixing method, and may be performed, as a specific example, by a roll mixing method. The blending order is not particularly limited, but it is preferable that components that are hardly reacted or decomposed by heat are sufficiently mixed, and then components that are easily reacted or decomposed by heat, such as a crosslinking agent, are mixed in a short time at a temperature in which a reaction or decomposition is not generated. The acrylic copolymer composition according to the present invention has a small degree of rubber adhesion to a roll and has an excellent workability when being subjected to roll mixing milling with a roll.

In addition, a molding method of the acrylic copolymer composition according to the present invention may be performed by compression molding, injection molding, transfer molding, or extrusion molding. In addition, a crosslinking method is preferably selected depending on a shape of a crosslinked product, and may be a method in which molding and crosslinking are performed at the same time, a method in which crosslinking is performed after molding, and the like. The acrylic copolymer composition according to the present invention is obtained by using an acrylic copolymer having the above configuration, such that fluidity of the acrylic copolymer is excellent when molding is performed and a degree of occurrence of burr is low when molding is performed, and molding precision of the obtained molded product is high.

The acrylic copolymer composition according to the present invention may be prepared into a crosslinked product by being heated. After the acrylic copolymer of the present invention is crosslinked, a product may be produced by forming the acrylic copolymer into a desired shape by a molding or extruding process and simultaneously or subsequently curing the acrylic copolymer.

In addition, the produced product may be used as various vehicle components such as rubber for mounting an engine, a transmission seal, and a crank shaft seal.

Hereinafter, the present invention will be described in more detail by Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Acrylic Copolymer>
To a polymerization reactor, a monomer mixture consisting of 32 wt % of butyl acrylate, 50 wt % of ethyl acrylate, 14.5 wt % of 2-methoxy ethyl acrylate, and 3.5 wt % of vinyl chloroacetate, and 3.0 parts by weight of sodium lauryl sulfate, 0.5 parts by weight of sodium metabisulfite, 0.01 parts by weight of cumene hydroperoxide, 0.01 parts by weight of sodium formaldehyde sulfoxylate, 0.05 parts by weight of 4-cyano-4-(phenylcarbonothioylthio)pentanoic acid, and 400 parts by weight of water, with respect to 100 parts by weight of the monomer mixture were added, and then polymerization was initiated at 40° C.

At the time when a polymerization conversion rate has reached 93%, 0.3 parts by weight of a polymerization terminating agent was added to the mixture to terminate the polymerization. Thereafter, an antioxidant was added thereto, flocculation was performed in an aqueous phase in which a flocculant with a temperature of 65° C. is added, thereby obtaining an acrylic copolymer.

<Preparation of Acrylic Copolymer Composition>
100 parts by weight of the acrylic copolymer was stirred at 30 rpm and 50° C. for 30 seconds with Haake mixer, 50 parts by weight of carbon black, 1.0 part by weight of stearic acid, 2.0 parts by weight of an antioxidant, 0.3 parts by weight of sulfur, 0.3 parts by weight of a potassium soap, and 2.5 parts by weight of a sodium soap were added, and then blending was performed at 90° C. for 360 seconds, thereby obtaining the acrylic copolymer composition blended with a roll mill device.

Example 2

Preparations were performed in the same manner as that of Example 1, except that 0.05 parts by weight of 1,1,1-tris [(dodecylthiocarbonothioylthio)-2-methylpropionate]ethane was added instead of 0.05 parts by weight of 4-cyano-4-(phenylcarbonothioylthio)pentanoic acid in the preparation of the acrylic copolymer of Example 1.

Example 3

Preparations were performed in the same manner as that of Example 1, except that 0.05 parts by weight of 2-(4-methoxyphenylcarbonothioylthio)ethanoic acid was added instead of 0.05 parts by weight of 4-cyano-4-(phenylcarbonothioylthio)pentanoic acid in the preparation of the acrylic copolymer of Example 1.

Example 4

Preparations were performed in the same manner as that of Example 1, except that 0.45 parts by weight of 4-cyano-4-(phenylcarbonothioylthio)pentanoic acid was added instead of 0.05 parts by weight of 4-cyano-4-(phenylcarbonothioylthio)pentanoic acid in the preparation of the acrylic copolymer of Example 1.

Example 5

Preparations were performed in the same manner as that of Example 1, except that 0.06 parts by weight of 4-cyano-4-(phenylcarbonothioylthio)pentanoic acid was added instead of 0.05 parts by weight of 4-cyano-4-(phenylcarbonothioylthio)pentanoic acid in the preparation of the acrylic copolymer of Example 1.

Example 6

Preparations were performed in the same manner as that of Example 1, except that 0.07 parts by weight of 4-cyano-4-(phenylcarbonothioylthio)pentanoic acid was added instead of 0.05 parts by weight of 4-cyano-4-(phenylcarbonothioylthio)pentanoic acid in the preparation of the acrylic copolymer of Example 1.

Example 7

Preparations were performed in the same manner as that of Example 1, except that in the monomer mixture, 5 wt % of vinyl chloroacetate was added instead of 3.5 wt % of vinyl chloroacetate in the preparation of the acrylic copolymer of Example 1.

Comparative Example 1

Preparations were performed in the same manner as that of Example 1, except that 4-cyano-4-(phenylcarbonothioylthio)pentanoic acid was not added in the preparation of the acrylic copolymer of Example 1.

Comparative Example 2

Preparations were performed in the same manner as that of Example 1, except that 0.01 parts by weight of 4-cyano-4-(phenylcarbonothioylthio)pentanoic acid was added instead of 0.05 parts by weight of 4-cyano-4-(phenylcarbonothioylthio)pentanoic acid in the preparation of the acrylic copolymer of Example 1.

Comparative Example 3

Preparations were performed in the same manner as that of Example 1, except that 0.1 parts by weight of 4-cyano-4-(phenylcarbonothioylthio)pentanoic acid was added instead of 0.05 parts by weight of 4-cyano-4-(phenylcarbonothioylthio)pentanoic acid in the preparation of the acrylic copolymer of Example 1.

Comparative Example 4

Preparations were performed in the same manner as that of Example 1, except that in the monomer mixture, 3.5 wt % of vinyl chloroacetate in the monomer mixture was not added in the preparation of the acrylic copolymer of Example 1.

Comparative Example 5

Preparations were performed in the same manner as that of Example 1, except that 0.3 parts by weight of 4-cyano-4-(phenylcarbonothioylthio)pentanoic acid was added instead of 0.05 parts by weight of 4-cyano-4-(phenylcarbonothioylthio)pentanoic acid in the preparation of the acrylic copolymer of Example 1.

EXPERIMENTAL EXAMPLE

Experimental Example 1

An average weight molecular weight of each of the acrylic copolymers prepared in Examples 1 to 7 and Comparative Examples 1 to 5, and a Mooney viscosity, workability, and a crosslinking density of each of the acrylic copolymer compositions prepared in Examples 1 to 7 and Comparative Examples 1 to 5, were measured by the following method. The results are shown in Tables 1 and 2.

Average weight molecular weight (Mw, g/mol): An average weight molecular weight (Mw) was measured under the following conditions with gel permeation chromatography (GPC), PL GPC220, manufactured by Agilent Technologies.

Column: Two PLgel Olexis (manufactured by Polymer Laboratories) columns and one PLgel mixed-C (manufactured by Polymer Laboratories) column were used in combination.

Solvent: 2 wt % of an amine compound was mixed with tetrahydrofuran.

Flow rate: 1 ml/min

Sample concentration: 0.3%

Column temperature: 34° C.

Detector: Waters 2414 RID

Standard: Polystyrene (correction performed using a cubic function)

Mooney viscosity (($ML_{1+4}$, 100° C.): A Mooney viscosity was measured using MV-2000 (manufactured by ALPHA Technologies) with a large rotor at a rotor speed of 2±0.02 rpm and 100° C. In this case, a sample used was left at room temperature (23±3° C.) for 30 minutes or longer, 27±3 g of the sample was collected and charged inside a die cavity, and a platen was operated, thereby measuring a Mooney viscosity for 4 minutes.

Blending workability (10 points): After preparing the acrylic copolymer composition, a degree of blending of carbon black, other additives, and the acrylic copolymer was evaluated by a 10 point method by observing a roughness degree of a surface and the amount of residual additive with the naked eyes. The better the blending was, the closer the score was to 10 points.

<Roughness Degree and Residual Additive Evaluation Criteria>

1 Point: Even discoloration of the acrylic copolymer did not occur due to the additives.

3 Points: The residual additive did not adhere to the acrylic copolymer after blending.

5 Points: The residual additive was smeared on the hand.

7 Points: The residual additive was not smeared on the hand, but gloss was partially observed.

10 Points: The residual additive was not observed with the naked eyes, and a partial gloss was not observed.

Roll workability (10 points): A degree of adhesion to the roll mill was observed while the blended copolymer passed through the roll mill 10 times and was measured by a 10 point method. It was determined that the lower the degree of adhesion, the better the physical properties; in this case, the evaluation result was close to 10 points.

<Evaluation Criteria>

1 Point: The blended copolymer adhered to the roll when the roll operation was performed one time.

3 Points: The blended copolymer adhered to the roll when the roll operation was performed 3 times.

5 Points: The blended copolymer adhered to the roll when the roll operation was performed 7 times.

7 Points: The blended copolymer adhered to the roll when the roll operation was performed 10 times.

10 Points: The blended copolymer did not adhere to the roll even though the roll operation was performed 10 times or more.

Crosslinking density (Torque (dNm)): After blending, a crosslinking density of the copolymer subjected to a roll mill process was evaluated from a difference between an initial torque value and a final torque value obtained by performing crosslinking at 180° C. for 30 minutes with Moving die rheometer (MDR).

TABLE 1

| Classification | | Example | | | | | | |
| --- | --- | --- | --- | --- | --- | --- | --- | --- |
| | | 1 | 2 | 3 | 4 | 5 | 6 | 7 |
| Average weight molecular weight (g/mol) | | 1,020,000 | 1,320,000 | 1,360,000 | 1,200,000 | 970,000 | 900,000 | 890,000 |
| Mooney viscosity ($ML_{1+4}$, 100° C.) | | 40.2 | 42.1 | 43.1 | 41.2 | 37.2 | 36.2 | 35.1 |
| Workability | Blending workability | 9 | 8 | 7 | 8 | 8 | 8 | 8 |
| | Roll mill workability | 8 | 6 | 7 | 7 | 6 | 7 | 7 |
| Crosslinking density | ML | 2.8 | 2.9 | 3.0 | 3.1 | 2.6 | 3.7 | 3.7 |
| | MH | 15.9 | 13.2 | 12.5 | 12.6 | 13.6 | 15.8 | 15.8 |
| | MH − ML | 13.1 | 10.3 | 9.5 | 9.5 | 11.0 | 12.1 | 12.1 |

TABLE 2

| Classification | | Comparative Example | | | | |
| --- | --- | --- | --- | --- | --- | --- |
| | | 1 | 2 | 3 | 4 | 5 |
| Average weight molecular weight (g/mol) | | 1,920,000 | 1,520,000 | 850,000 | 1,570,000 | 600,000 |
| Mooney viscosity ($ML_{1+4}$, 100° C.) | | 24.1 | 31.2 | 34.1 | 43.1 | 27.7 |
| Workability | Blending workability | 2 | 7 | 9 | 9 | 8 |
| | Roll mill workability | 5 | 8 | 4 | 8 | 3 |
| Crosslinking density | ML | 2.7 | 3.5 | 2.4 | 2.7 | 2.5 |
| | MH | 9.8 | 14.5 | 8.6 | 2.7 | 12.6 |
| | MH − ML | 7.1 | 11.0 | 6.2 | 0 | 10.1 |

Referring to Table 1, it could be confirmed that the workability and crosslinking density were excellent in Examples 1 to 7 in which the chain transfer agent according to the present invention was included.

On the other hand, it could be confirmed that the workability and crosslinking density were deteriorated in Comparative Example 1 in which the chain transfer agent according to the present invention was not included. In addition, it could be confirmed that, in Comparative Example 1, the average weight molecular weight was hardly adjusted to an appropriate range due to not including the chain transfer agent, and in particular, the blending workability was deteriorated due to a high content of gel.

In addition, it could be confirmed that even though the chain transfer agent according to the present invention was included, the workability or crosslinking density in Comparative Examples 2, 3, and 5 in which a content of the chain transfer agent was out of an appropriate range was deteriorated as compared to Examples in which a content of the chain transfer agent is in the appropriate range.

In addition, it could be confirmed that the crosslinking density in Comparative Example 4 in which the crosslinking monomer was not included was deteriorated.

The invention claimed is:

1. An acrylic copolymer comprising:
a main monomer-derived repeating unit; and
a chain transfer agent-derived part,
wherein the main monomer-derived repeating unit includes a (meth)acrylic acid alkyl ester monomer-derived repeating unit, a (meth)acrylic acid alkoxy alkyl ester monomer-derived repeating unit, and a crosslinking monomer-derived repeating unit,
wherein the chain transfer agent-derived part is derived from a chain transfer agent having a carbonothioylthio group, and
wherein the chain transfer agent-derived part is included in an amount of 0.03 parts by weight to 0.08 parts by weight with respect to 100 parts by weight of the main monomer-derived repeating unit.

2. The acrylic copolymer of claim 1, wherein the chain transfer agent-derived part is included in an amount of 0.045 parts by weight to 0.07 parts by weight with respect to 100 parts by weight of the main monomer-derived repeating unit.

3. The acrylic copolymer of claim 1, wherein the chain transfer agent is one or more selected from the group consisting of 4-cyano-4-(phenylcarbonothioylthio)pentanoic acid, 1,1,1-tris[(dodecylthiocarbonothioylthio)-ethanoic acid, 2-(4-methoxyphenylcarbonothioylthio)ethanoic acid, 2-(phenylcarbonothioylthio)propanoic acid, 2-nitro-5-(2-propynyloxy)benzyl 4-cyano-4-(phenylcarbonothioylthio)pentanoate, 3-butenyl 2-(dodecylthiocarbonothioylthio)-2-methylpropionate, benzyl benzodithioate, cyanomethyl[3-(trimethoxysilyl)propyl]trithiocarbonate, ethyl 2-(4-methoxyphenylcarbonothioylthio)acetate, ethyl 2-(phenylcarbonothioylthio)-2-phenylacetate, phthalimidomethyl butyl trithiocarbonate, and a derivative thereof.

4. The acrylic copolymer of claim 1, wherein the main monomer-derived repeating unit further comprises an ethylenically unsaturated nitrile monomer-derived repeating unit.

5. The acrylic copolymer of claim 1, wherein the main monomer-derived repeating unit includes 80 wt % to 99.9 wt % of the (meth)acrylic acid alkyl ester monomer-derived repeating unit and the (meth)acrylic acid alkoxy alkyl ester monomer-derived repeating unit; and 0.1 wt % to 20 wt % of the crosslinking monomer-derived repeating unit.

6. The acrylic copolymer of claim 1, wherein an average weight molecular weight of the acrylic copolymer is 890,000 g/mol to 1,360,000 g/mol.

7. The acrylic copolymer of claim 1, wherein a Mooney viscosity ($ML_{1+4}$, 100° C.) of the acrylic copolymer is 10 to 70.

8. A method of preparing an acrylic copolymer, comprising:
   preparing a main monomer mixture including a (meth)acrylic acid alkyl ester monomer, a (meth)acrylic acid alkoxy alkyl ester monomer, and a crosslinking monomer; and
   adding 0.03 parts by weight to 0.08 parts by weight of a chain transfer agent with respect to 100 parts by weight of the main monomer mixture and performing a polymerization,
   wherein the chain transfer agent has a carbonothioylthio group.

9. The method of claim 8, wherein in the preparing the main monomer mixture, an ethylenically unsaturated nitrile monomer is included.

10. An acrylic copolymer composition comprising the acrylic copolymer of claim 1 and a filler.

11. The acrylic copolymer of claim 1, wherein an average weight molecular weight of the acrylic copolymer is 750,000 g/mol to 1,600,000 g/mol.

* * * * *